US012031327B1

(12) United States Patent
Laydera-Collins et al.

(10) Patent No.: US 12,031,327 B1
(45) Date of Patent: Jul. 9, 2024

(54) SUSPENDED CEILING GRID HANGING SYSTEM

(71) Applicant: Gordon Sales, Inc., Bossier City, LA (US)

(72) Inventors: Imack Laydera-Collins, Benton, LA (US); Steven Mark Ladatto, Bossier City, LA (US); Steven Jeremy Shugarts, Bossier City, LA (US); Daniel E. Smiley, Benton, LA (US); Robert Ronald Rombough, Cibolo, TX (US)

(73) Assignee: Gordon Sales, Inc., Bossier City, LA (US)

( * ) Notice: Subject to any disclaimer, the term of this patent is extended or adjusted under 35 U.S.C. 154(b) by 0 days.

(21) Appl. No.: 18/239,732

(22) Filed: Aug. 29, 2023

Related U.S. Application Data

(60) Provisional application No. 63/405,952, filed on Sep. 13, 2022, provisional application No. 63/401,916, filed on Aug. 29, 2022.

(51) Int. Cl.

| | |
|---|---|
| ***E04B 9/14*** | (2006.01) |
| ***A62C 35/68*** | (2006.01) |
| ***E04B 9/00*** | (2006.01) |
| ***E04B 9/06*** | (2006.01) |
| ***E04B 9/18*** | (2006.01) |
| *E04B 9/20* | (2006.01) |

(52) U.S. Cl.
CPC ................ *E04B 9/14* (2013.01); *A62C 35/68* (2013.01); *E04B 9/006* (2013.01); *E04B 9/064* (2013.01); *E04B 9/183* (2013.01); *E04B 9/20* (2013.01)

(58) Field of Classification Search
CPC . E04B 9/14; E04B 9/006; E04B 9/064; E04B 9/183; E04B 9/20
USPC .......................................... 52/506.07, 506.08
See application file for complete search history.

(56) References Cited

U.S. PATENT DOCUMENTS

| | | | | |
|---|---|---|---|---|
| 2,977,460 A * | 3/1961 | Franck | E04B 9/18 | 248/343 |
| 3,067,323 A * | 12/1962 | Raymond | E04B 9/006 | 52/762 |
| 3,842,561 A * | 10/1974 | Wong | E04H 9/021 | 52/506.07 |
| 3,969,865 A * | 7/1976 | Andersen | E04B 9/20 | 52/506.07 |
| 4,084,364 A * | 4/1978 | Jones | E04B 9/18 | 52/39 |
| 4,434,599 A * | 3/1984 | McCall | E04B 9/006 | 52/506.07 |
| 4,926,606 A * | 5/1990 | Hanson | E04B 9/065 | 52/506.07 |

(Continued)

*Primary Examiner* — Brent W Herring
(74) *Attorney, Agent, or Firm* — Jones Walker LLP

(57) ABSTRACT

Disclosed herein is a modular suspended ceiling grid system that uses joining hubs to connect tee frame members into a load-bearing framework. The tee frame members have coupling structures on each end that attach to the joining hubs. The joining hubs also have central holes that allow a sprinkler system or other hardware to be installed without altering any of the grid system elements. A plurality of hangers adapted to engage a top rail of the tee frame members via either a snap fit or a sliding fit may be utilized to connect the ceiling grid system to the building structure.

17 Claims, 17 Drawing Sheets

300

(56) References Cited

U.S. PATENT DOCUMENTS

| | | | | | |
|---|---|---|---|---|---|
| 5,077,951 | A * | 1/1992 | Baker | E04B 9/064 | 52/106 |
| 5,313,759 | A * | 5/1994 | Chase, III | E04B 9/18 | 52/39 |
| 5,469,681 | A * | 11/1995 | Wu | E04B 9/14 | 52/669 |
| 5,611,185 | A * | 3/1997 | Wilz | E04B 9/26 | 52/471 |
| 5,619,833 | A * | 4/1997 | Neff | E04B 9/30 | 52/506.07 |
| 6,158,186 | A * | 12/2000 | Feller | E04B 9/14 | 52/506.07 |
| 6,892,500 | B2 * | 5/2005 | Zaborowski | E04B 9/006 | 52/506.07 |
| 7,810,294 | B2 * | 10/2010 | Maley | E04B 9/18 | 52/489.1 |
| 7,886,496 | B1 * | 2/2011 | Spransy | E04B 9/127 | 52/506.07 |
| 9,091,053 | B2 * | 7/2015 | Labonte | E04B 9/28 | |
| 2003/0213199 | A1 * | 11/2003 | Bongio | E04B 9/183 | 52/506.07 |
| 2011/0072744 | A1 * | 3/2011 | Maley | E04F 19/066 | 52/220.1 |

* cited by examiner

338

SUSPENDED CEILING GRID HANGING SYSTEM

CROSS-REFERENCE TO RELATED APPLICATIONS

This application claims the benefit of priority from U.S. Provisional Patent Application Ser. No. 63/401,916, filed on Aug. 29, 2022, and U.S. Provisional Patent Application Ser. No. 63/405,952 filed on Sep. 13, 2022, each of which are hereby incorporated by reference.

BACKGROUND OF THE INVENTION

In construction buildings the typical unfinished ceiling plenum space is roughly finished, non-insulated and/or occupied by electrical conductors, water pipes, air conditioning ducting, etc. A suspended ceiling system will conceal all these utilities and will provide thermal insulation, sound proofing, aesthetically pleasant finish, and offer easy installation for illumination, acoustical media, air conditioning vents, fire protection, and many other treatments. The typical suspended ceiling is an array of aluminum extrusions or formed steel profiles in the shape of an inverted Tee that are laid out in a rectangular pattern leaving open spaces to be filled by ceiling panels. This array of supporting structure is anchored to the room deck or structural members. The panels are seated over the lower flanges of the metal tees and are typically held down by gravity.

The typical system for suspension and attachment for lightweight suspended ceiling systems consists of wires that are attached to the upper section of the grid tees at certain intervals to maintain the tees without deflecting under the load of the ceiling panels, lamps and miscellaneous accessories. The upper end of these wires is attached to structural elements of the building.

A second, more robust type of suspended ceiling system can be found in facilities where such suspended ceiling is exposed to wind loads and/or mechanical loads. An exemplary embodiment of a typical heavy-duty suspended ceiling system is depicted in FIG. 1. Typically, this type of suspended ceiling system comprises long frame members, known as main tees 11, and shorter, perpendicular frame members, known as cross tees 12, which are joined at multiple points along the main tees 11. These tees are inverted and have a groove on top with a continuous thread to engage bolts 19, which attach the tee-joining elements 13, 14, and 15 to the tees. These tee-joining elements 13, 14, and 15 are attached to the building's structural roof or ceiling by suspension rods 17. This type of suspended ceiling system requires three types of tee-joining elements: a four-way element 15 where a main tee 11 joins with a pair of cross tees 12; a three-way element 13 where a main tee 11 joins with one cross tee 12; and a two-way element 14 where two tees intersect at a corner. This type of construction presents certain inconveniences when installing fire sprinklers since special machining is necessary to allow the sprinklers' hardware to fit within the system. Additionally, the installation is labor intensive due to the large number of fasteners used.

One specific application of these heavy duty suspended ceiling systems are cleanrooms—a controlled, contaminant-free work area suitable for precision manufacturing and assembly operations, particularly in the fields of semiconductors, aerospace, bioscience, pharmaceuticals, medicine, and food processing. A cleanroom conventionally includes a ceiling system for supply air and a return air system integrated into the raised floor and/or sidewall(s), thereby providing a closed-loop arrangement for the conditioned space. In some ceiling systems, the suspended ceiling system supports air filters, blank panels, and lighting and defines an interior space between itself and the building structure to which it is attached. A supply duct or plenum provides temperature and humidity-conditioned air to the conditioned space.

In conventional cleanrooms, the utilities which sustain the manufacturing process are housed in separate "core areas" disposed between two cleanrooms. The utilities such as process piping, gases, and air/vacuum lines are usually introduced into the cleanroom through openings in the walls or penetrations through the ceiling. However, this conventional layout presents several problems. First, core areas occupy floor space which might otherwise be used as additional cleanroom space. Second, changing the size of a cleanroom is a cumbersome and costly ordeal which involves not merely relocating walls, but the removal and reinstallation of all of the utility equipment in an adjacent core area, especially when utilities and partitions penetrate the ceiling.

Conventional heavy-duty suspended ceiling systems, such as the one depicted in FIG. 1, are generally designed to support relatively light loads (e.g., air filters, blank panels, lights), typically on the order of a few pounds per square foot. Consequently, such systems are structurally unsuitable for bearing substantial loads such as process pipes, gas lines, air lines, vacuum lines, or a human technician who must service or repair equipment. Further, such ceiling systems are not suitable for directly supporting substantial loads suspended downward into the cleanroom such as Automated Material Handling Systems (AMEIS). Finally, the design of many conventional ceiling systems severely restricts the locations where a rod or other suspension member may be attached to the framework for suspending the ceiling system from the building structure.

Therefore, there is a need for an improved suspended ceiling system capable of supporting substantial loads either above or below the plane of the ceiling. Further, there is a need for improved suspended ceiling system having components that are installation-friendly and modular, thereby limited the number of specialized components (e.g., multiple types of tee-joining elements) needed to adapt the suspended ceiling system to a particular space.

BRIEF DESCRIPTION OF THE INVENTION

The invention disclosed herein is directed to an improved suspended ceiling system.

In a particular embodiment exemplifying the principles of the invention, the suspended ceiling system can comprise a plurality of hubs to connect tee frame members into a load-bearing framework. The tee frame members have tee couplers on each end that attach to a hub. The hubs also have central holes that allow a sprinkler system to be installed without altering any of the grid system elements.

In another particular embodiment exemplifying the principles of the invention, the suspended ceiling system can comprise a plurality of hangers adapted to engage a top rail of the tee frame members via either a snap fit or a sliding fit. The plurality of hangers each may comprise a body with parallel legs extending from the body to define an interior slot. The parallel legs each feature terminal hooks. The top rail of the tee frame members may comprise a neck portion and a head portion, wherein the head portion has a larger diameter than the neck portion. In this arrangement, to secure a tee frame member to a hanger, the head portion of the top rail is extended into the hanger's interior slot until the head portion's lip engages with the hanger's terminal hooks. The engagement of the head portion's lip with the hanger's terminal hooks will prevent the tee frame member from separating from the hanger when placed under a vertical load without requiring the typical bolted joints of prior art systems. The hanger(s) can be secured to the building structure with rods.

In yet another particular embodiment exemplifying the principles of the invention, the suspended ceiling system can comprise a plurality of hubs to connect tee frame members into a load-bearing framework, and the suspended ceiling system may also comprise a plurality of hangers adapted to engage a top rail of the tee frame members to connect the suspended ceiling system to the building structure.

In accordance with the present invention, a suspension coupling element (i.e., a hanger) may be disposed at practically any location on a frame member for engaging the top rail of the tee frame members. Such suspension coupling element in combination with the rail provides a substantial increase in the load-bearing capacity of the framework. The framework supports these greater loads with sufficiently small deflection of the frame members so that filters and other components that are sealed in an airtight manner are not unseated.

The greatly improved load-bearing capacity of the present invention is achieved at a low cost, is easy to assemble, and provides numerous additional advantages for a variety of applications that utilize suspended ceilings. This is especially true for cleanroom applications.

First, it permits construction of a cleanroom without requiring floor space for core area functions because all of the core area utilities may be supported overhead by the ceiling system. Thus, should reconfiguration of the cleanroom be necessary, this may be achieved without massive rerouting of utilities.

Second, the increased load-bearing capacity and small deflection under load allows a human technician to walk freely on top of the framework. This is particularly advantageous for installation, balancing, and maintenance of the utilities, air filters, and other components.

Third, equipment such as robotics, process piping, conveyor belts, and partitions may be suspended from the framework into the cleanroom. Since the framework itself is intended to bear practically all loads, regardless of whether they are positioned above or below the ceiling, the framework equipment may generally be placed anywhere on the framework and need not be aligned with nor attached to a joining hub. This adds much flexibility to the manufacturing or assembly operations conducted within the cleanroom.

Fourth, the rigid crosswise and lengthwise frame members are modular and allow non-progressive assembly of the frame. Frame members' connections are strong and easy to assemble.

Therefore, it is an object of this invention to provide a suspended ceiling system which permits construction of a cleanroom without necessarily predetermining floor space configuration for fixed clean or core areas. Additionally, the ceiling system's modular design allows adaptation to any cleanroom construction without modifying the assembly elements.

Another object of this invention is to provide a suspended ceiling system which eliminates the need for load-bearing partitions.

Another object of this invention is to provide a suspended ceiling system which permits reconfiguration of a cleanroom without substantial rerouting of utilities.

Another object of this invention is to provide a suspended ceiling system which is capable of supporting substantial loads either above or below the plane of the ceiling.

Another object of this invention is to provide a suspended ceiling system which will support a substantial load placed at practically any location on the system.

Another object of this invention is to provide a suspended ceiling system which allows suspension members to be positioned at substantially any location.

Another object of this invention is to provide a suspended ceiling system which exhibits, under applied loads, a sufficiently small deflection characteristic such that airtight seals surrounding air filters and other components remain intact even when the system is subjected to significant dead loads and live loads such as a human technician.

Other objects, advantages, and variations of the present invention will become apparent and obvious from a study of the following detailed description and accompanying drawings, which are merely illustrative of such invention.

BRIEF DESCRIPTION OF THE DRAWINGS

The foregoing invention will be understood more readily from the following detailed description of the invention, when taken in conjunction with the accompanying drawings, in which.

DETAILED DESCRIPTION OF THE INVENTION

Figure 1:
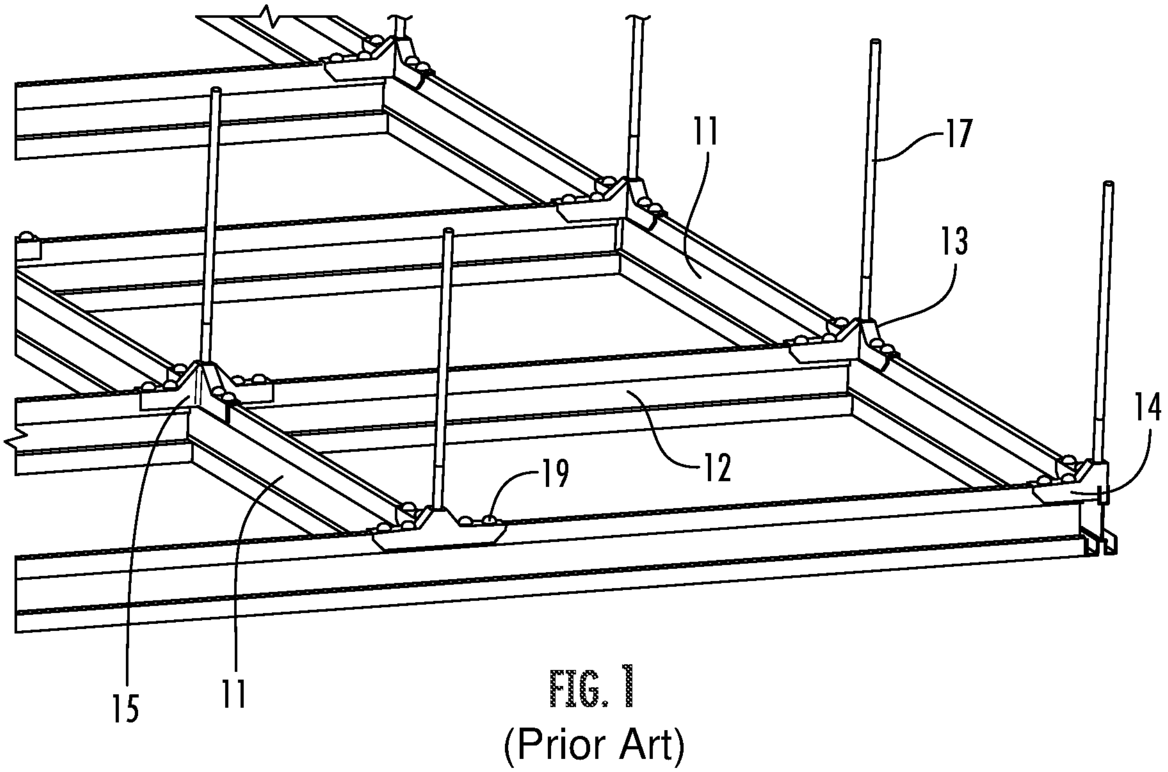
FIG. 1 (Prior Art)
FIG. 1 is an isometric representation of a typical prior art high strength grid.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. As used herein, the terms “a” or “an” are defined as one or more than one. The term “plurality,” as used herein, is defined as two or more than two. The term “another,” as used herein, is defined as at least a second or more. The terms “comprises,” “comprising,” and any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by “comprises . . . a” does not, without more constraints, preclude the existence of additional identical elements in the process, method, article, or apparatus that comprises the element. The terms “including,” “having,” and “featuring,” as used herein, are defined as comprising (i.e., open language). The terms “coupled” and “attached” as used herein, is defined as connected, although not necessarily directly, and not necessarily mechanically. As used herein, the term “about” or “approximately” applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, top and bottom, right and left, and the like may be used solely to distinguish one entity or action from another entity or action without necessarily requiring or implying any actual such relationship or order between such entities or actions.

Herein various embodiments of the present invention are described. To avoid redundancy, repetitive description of similar features may not be made in some circumstances. It shall be understood, however, that description of a first-appearing feature applies to the later described similar feature and each respective description, therefore, is to be incorporated therein without such repetition.

Figure 2:
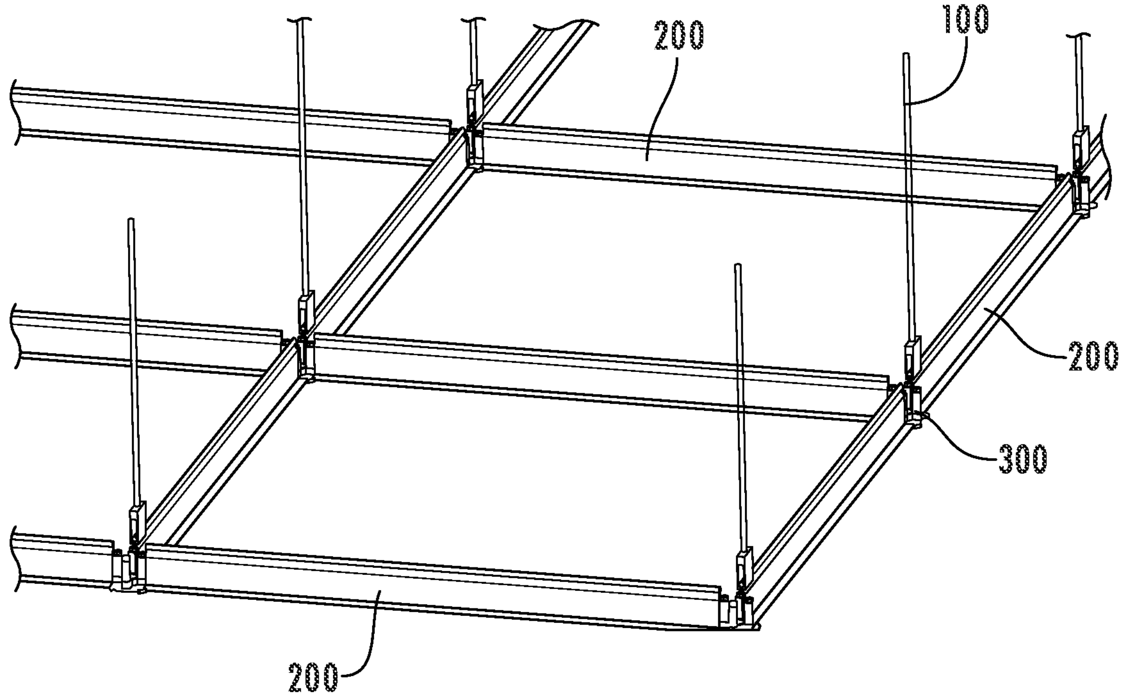
FIG. 2 is an isometric representation of the modular suspended ceiling grid system of the present invention.

Exemplary embodiments of the modular grid system of the present invention are shown in FIGS. 1-18. Referring to FIG. 2, in the depicted suspended ceiling system there is no distinction between main tees and cross tees, since all these elements are segmented and, depending on the design of the frames, may be equal or different in length. For example, in a 48"×48" grid system, the tees will be all equal lengths, but in a 24"×48" grid system, the tees will be different lengths. Unlike the typical suspended ceiling system of FIG. 1, only one type of tee-joining elements 300 is used in this system, because the tees 200 are joined at intersections formed at their ends, rather than in the various end-to-end and end-to-middle configurations of the prior art. The tees 200 are joined at these intersections by a modular joint system 300 comprising a hub 310 and a tee coupler 330.

Referring now to FIGS. 3-6, the interaction of the tee frame members 200 with the modular joint system 300 is illustrated. In the depicted embodiment, the tee frame member 200 has a horizontal base, a hollow body extending vertically from the horizontal base, and a rail 250 positioned on the top of the hollow body. The tail section 336 of the tee coupler 330 may be positioned at least partially within the tee cavity 220 formed in each end 210 of the tee frame member 200. In preferred embodiments, the tee coupler 330 is secured to each end 210 of the tee frame member 200 via press-fitting. In other embodiments, a fastener (e.g., a bolt, pin, etc.) may be utilized to secure the two components together. The head section 332 of the tee coupler 330 may be attached to the hub 310 by bolts 340 or other fastening means known in the art. The hub 310 also preferably has a central hole 370 adapted to receive a sprinkler tube or other fixtures when necessary. The central hole 370 in the hub 310 allows a sprinkler tube to be placed at any intersection of the system without the use of a special joining hub. In alternative embodiments, the central hole 370 could be used to receive any equipment designed for installation in a ceiling. When a sprinkler is not used at a certain tee intersection, the central hole 370 of that hub 310 may be capped with a plastic plug (not shown).

Figure 6:
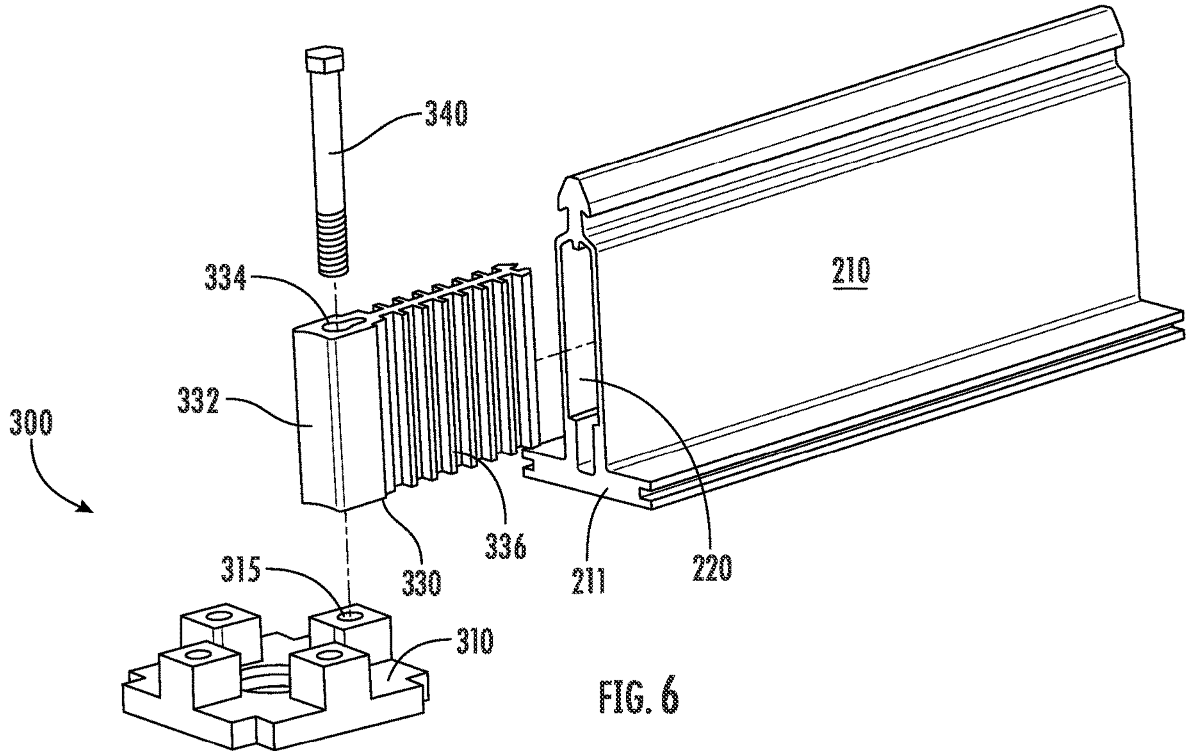
FIG. 6 is an exploded view of the bolted joint system of the modular suspended ceiling grid system of FIG. 2.

As best shown in FIG. 6, the tee couplers 330 are nested into the tee cavity 220 of the tee frame member 200. Each tee coupler 330 comprises a coupling head 332 having a hole 334 to receive the bolt 340. The bolt 340 is threaded into a threaded hole 315 on the joining hub 310. The tee coupler 330 also includes a tail section 336 that is fitted into the tee cavity 220 of the tee frame member 200. Preferably, when assembled, the tail section 336 is positioned completely within the tee cavity 220, leaving only the coupling head 332 protruding from the tee cavity 220 such that it can abut the mating face 318 of the hub 310. Those skilled in the art will readily understand that the form and shape of the tee couplers 330 is not limited to the exemplary configurations shown by FIG. 6.

Figure 7:
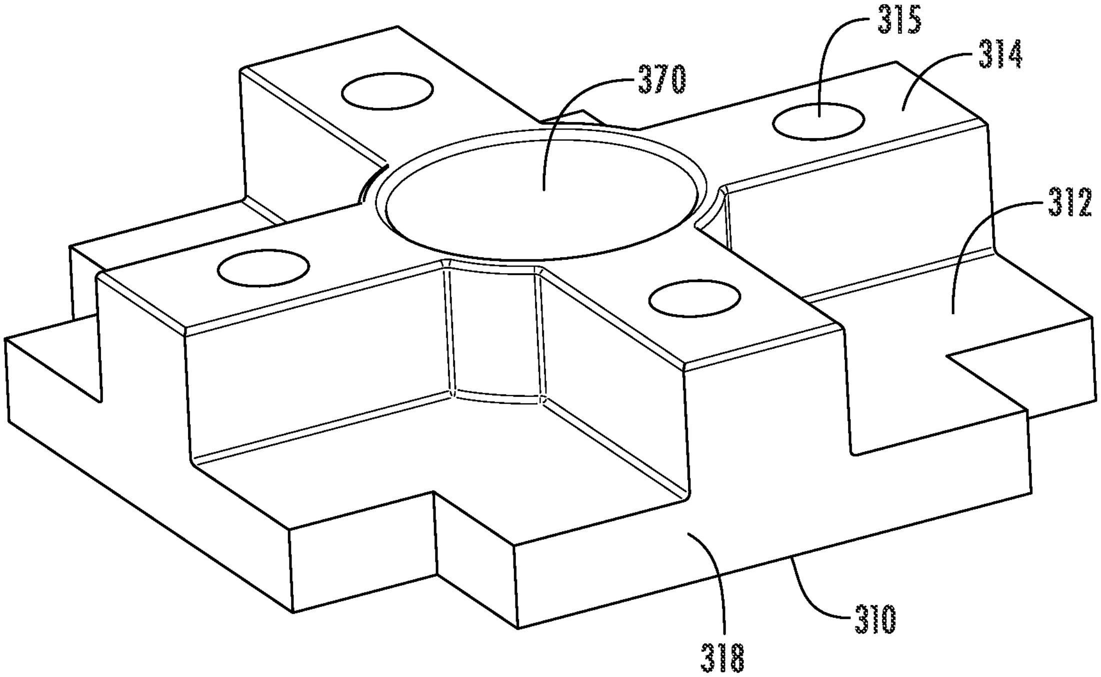
FIG. 7 is an isometric view of the joining hub of FIG. 4.

FIG. 7 depicts a preferred embodiment of the hub 310. The hub 310 may comprise a four-sided base 312, four raised pads 314 extending vertically from the base, and a central hole 370. The hub 310 is designed in a manner that the bottom surface of the conjoining tee frame members 200 are flush with the underneath face of the base 312. The base 312 has four raised pads 314 adapted to support the head section 332 of the tee coupler 330 as shown in FIG. 6. The raised pads 314 include a threaded hole 315 for receiving a threaded bolt 340 shown in FIG. 6. The threaded bolt 340 anchors the tee coupler 330 to the joining hub 310. The base 320 also includes a mating face 318 that sits in contact with the end face 211 of the tee frame member 200 when tee frame member 200 is connected to the joining hub 310. The joining hub 310 depicted in FIG. 7 also includes a central hole 370 for insertion of a sprinkler tube (not shown).

Figure 3:
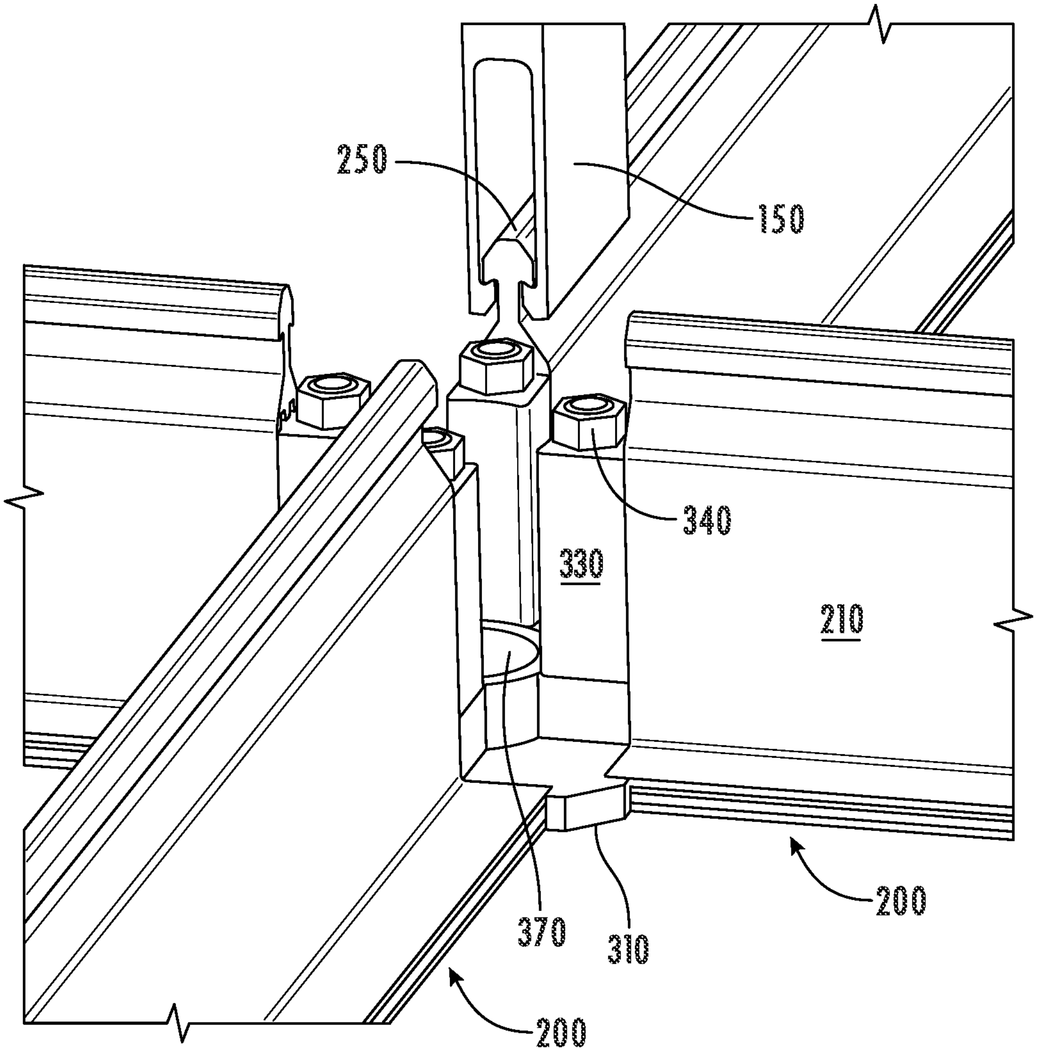
FIG. 3 is a representation of the bolted joint system of modular suspended ceiling grid system of FIG. 2.
Figure 4:
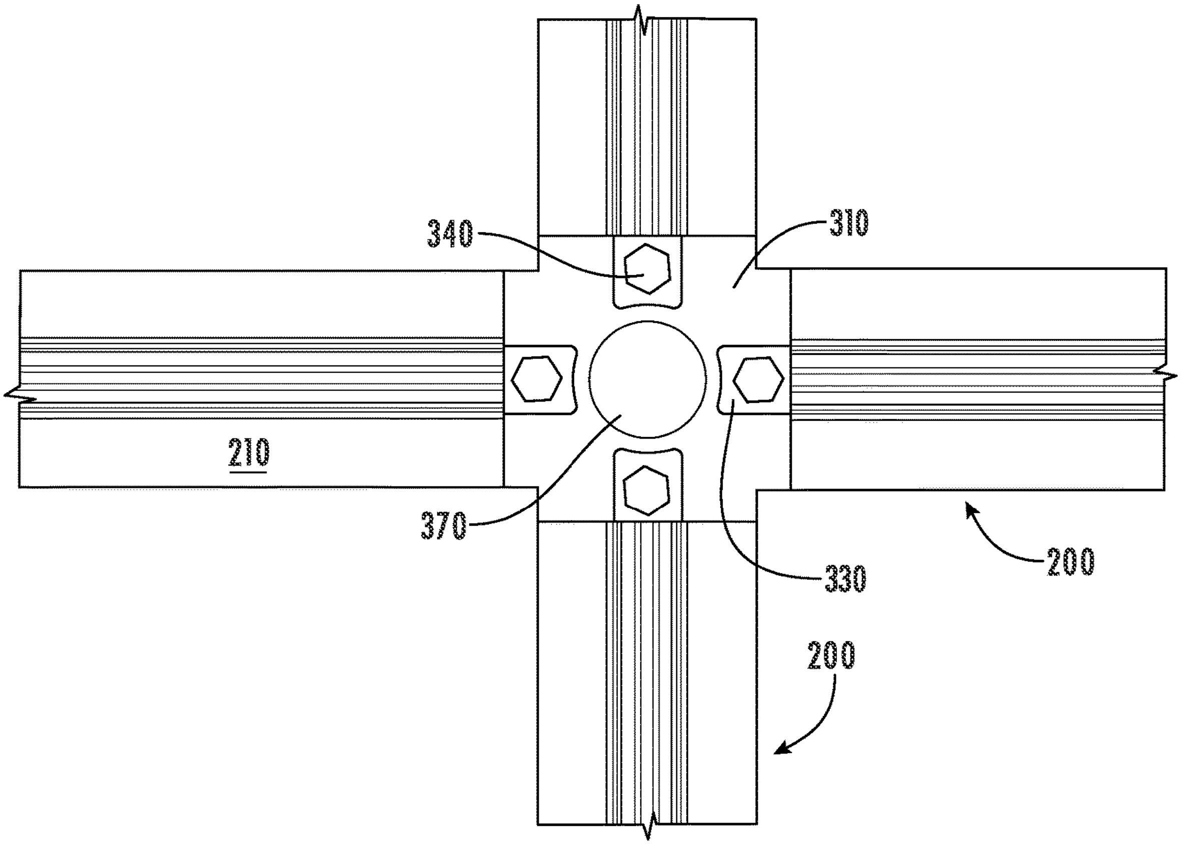
FIG. 4 is a top view of the joining hub of the modular suspended ceiling grid system of FIG. 2.
Figure 5:
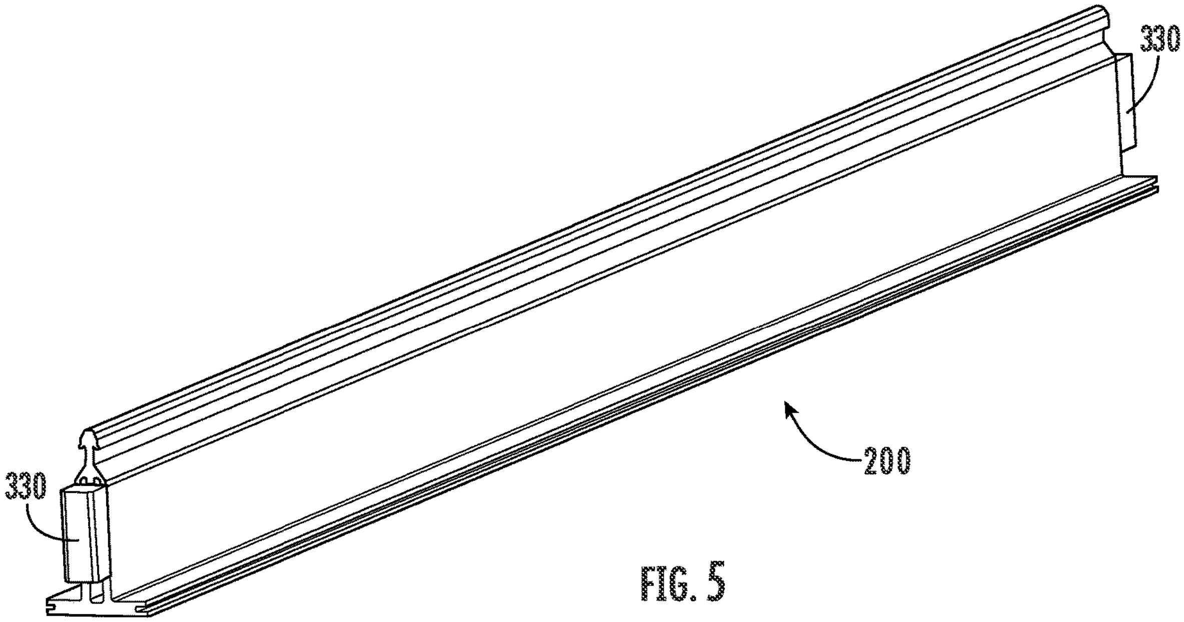
FIG. 5 is a representation of the tee assembly of the modular suspended ceiling grid system of FIG. 2.

The tee frame members 200 used in the grid system of FIGS. 2-7 are designed to be suspended from a building structure (e.g., the building's ceiling and/or rafters) by hangers 150 attached to suspension rods 100. As is best illustrated by FIG. 3, the hanger 150 is nested around a rail 250 at the top of the vertical portions of tee segment 210, thereby attaching the suspended ceiling system to the building structure. The off-center location of the hanger 150 allows the insertion of a sprinkler tube into the central hole 370 of the joining hub 310 at any intersection, without the need to remove or machine any of the elements of the modular grid system. The Referring now to FIGS. 9-18, various embodiments of a hanger system 150 exemplifying features of the present invention are shown. The hanger system 150 of the present invention can be used with the modular joint system 300 depicted in FIGS. 2-8, or the hanger system 150 can be used with a conventional joint system typically utilized with suspended ceiling grid systems.

Figure 10:
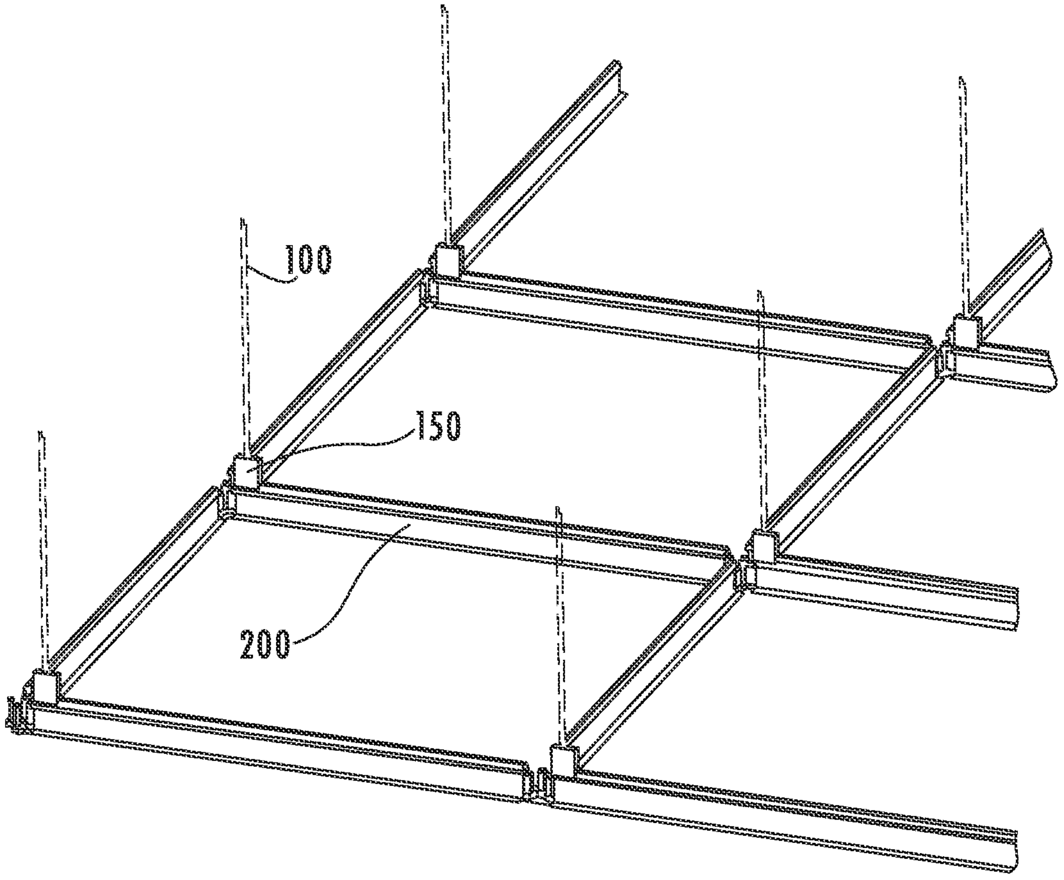
FIG. 10 is an isometric view of the structural grid to support the typical suspended ceiling.
Figure 11:
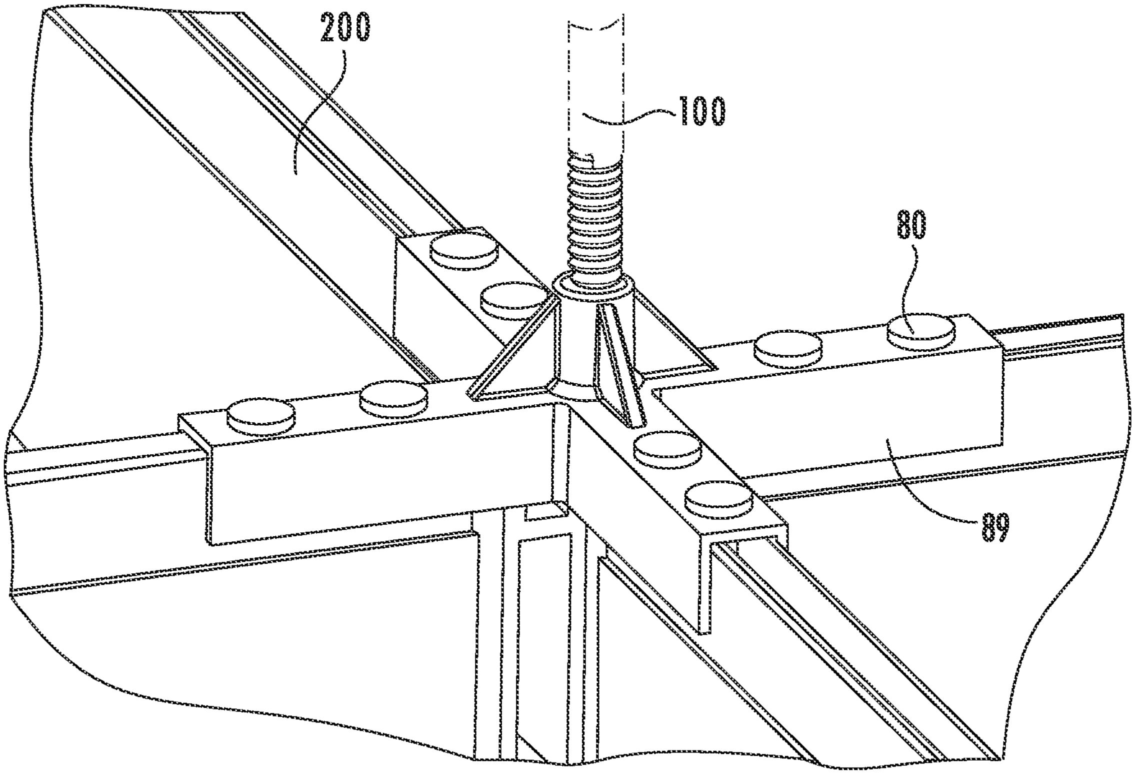
FIG. 11 represents the typical connection between the grid support system and the tee conforming the grid.
Figure 12:
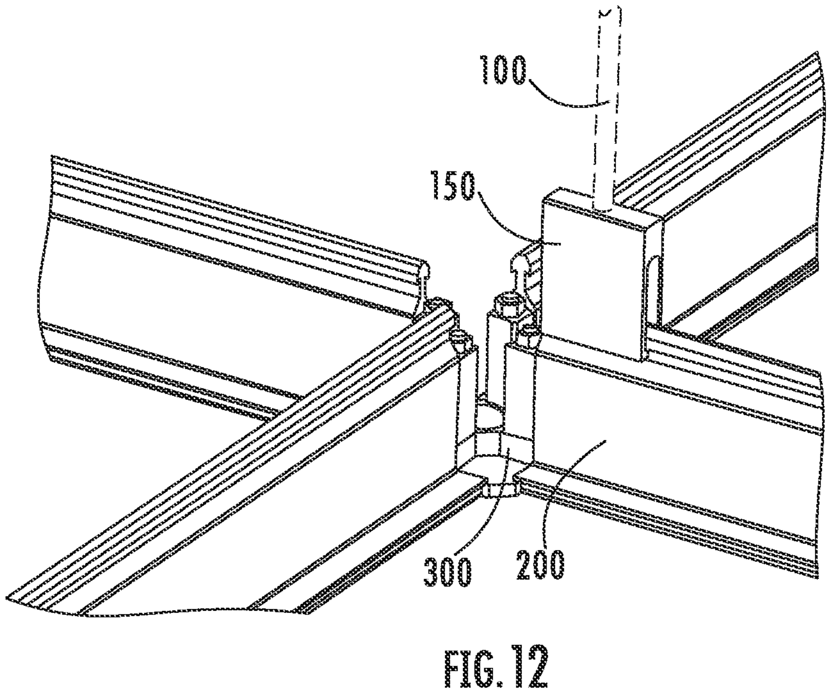
FIG. 12 depicts the suspension system object of the present invention.

Referring to FIGS. 9-12, the tee frame members 200 serve as the structural element of the grid and it is arranged in an array of squares or rectangular lattice as shown by FIG. 10. At predetermined intervals the tees 200 are held in place by a system of rods 100 connected to the ceiling structural elements. The interface between the suspension rods 100 and the tee 200 is provided by a hanger element 150, which is threaded into the rod 100 and is interconnected to the tee 200 by structures that prevent relative vertical displacement. FIG. 11 shows the traditional suspension system utilized for heavy duty suspension systems where the tee intersections are bolted through a casting 89 into a linear threaded surface at the top of the tees 200 using multiple bolts 80. Using this method, the tees 200 are held together in position and are attached to the structural members of the building by the metallic rod 100. In contrast as shown in FIG. 12, representing the system object of the present invention where the casting 89 and bolts 80 are replaced by a single hanger element 150 while the tees 200 are held together by a bolted joint system 300.

Figure 13:
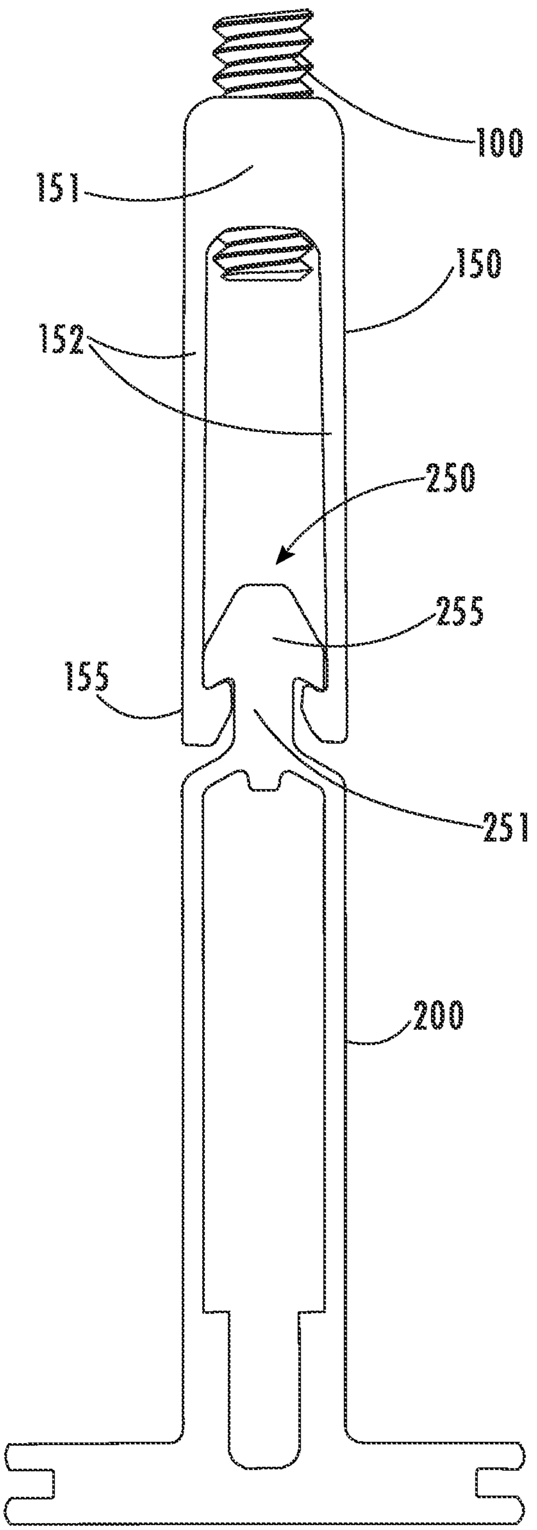
FIG. 13 is a front view depicting the hanger-tee interface on the system of the present invention.
Figure 14A:
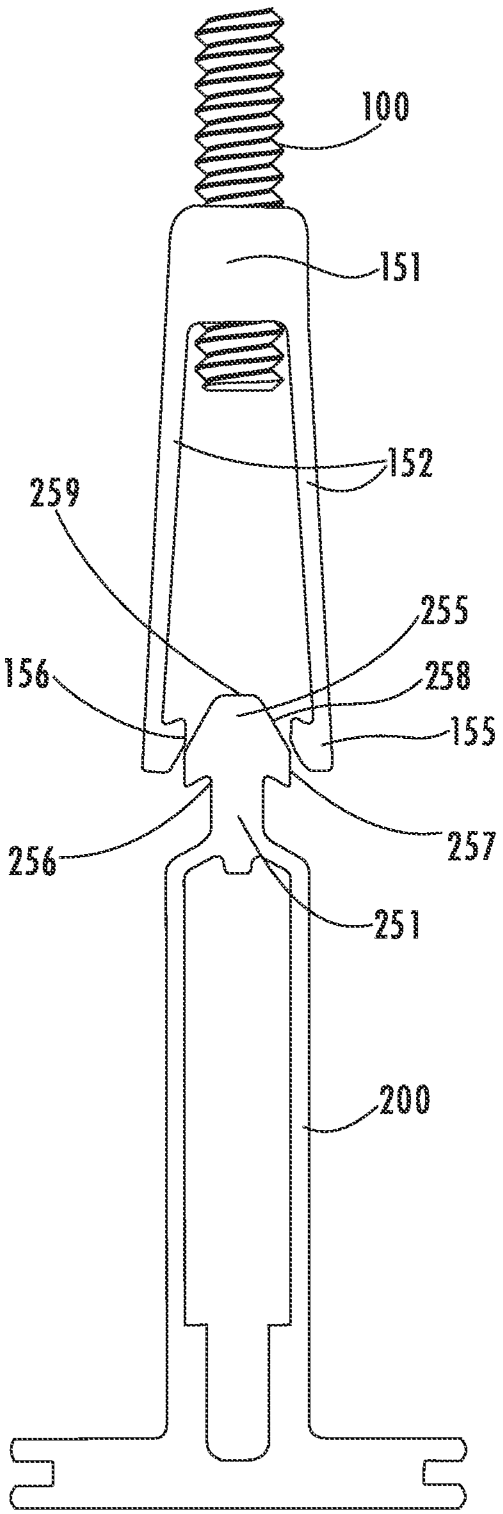
FIGS. 14*a* and 14*b* are front views of the hanger-tee interface on the system of the present invention during the suggested installation method.
Figure 14B:
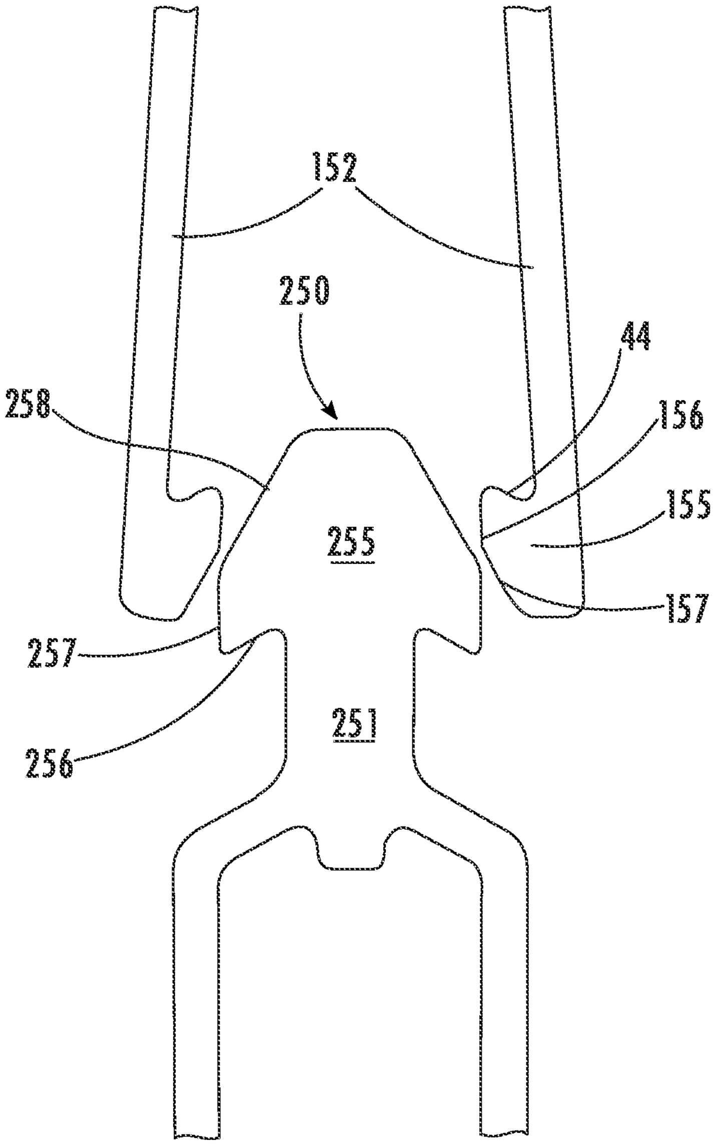

In a preferred embodiment depicted in FIGS. 13, 14*a* and 14*b*, the hanger 150 has a body section 151, two substantially parallel legs 152 that extend from the body 151, and a terminal hook 155 located on each lower end of parallel legs 152. The hooks 155, include a notch 158, a ridge 156 and a ramp 157.

Each tee frame member 200 comprises a rail 250 positioned on the top of the tee's hollow body. The rail 250 can be integrally formed with the hollow body, or it can be attached to the hollow body with a fastener or via welding, glue, or other known connecting means. In the depicted embodiment, the rail 250 comprises a vertically-extending neck portion 251 and a head portion 255 that is greater in diameter than the neck portion 251. In certain embodiments, the head portion 255 can be in the shape of an arrowhead. The head portion 255 can comprise a top surface 259, left and right ramps 258 extending at a reflex angle from the top surface 259, and ridge sections 257 extending from the left and right ramps 258, and left and right lips 256 interconnecting the ridge sections 257 to the neck portion of the rail 250.

Figure 15:
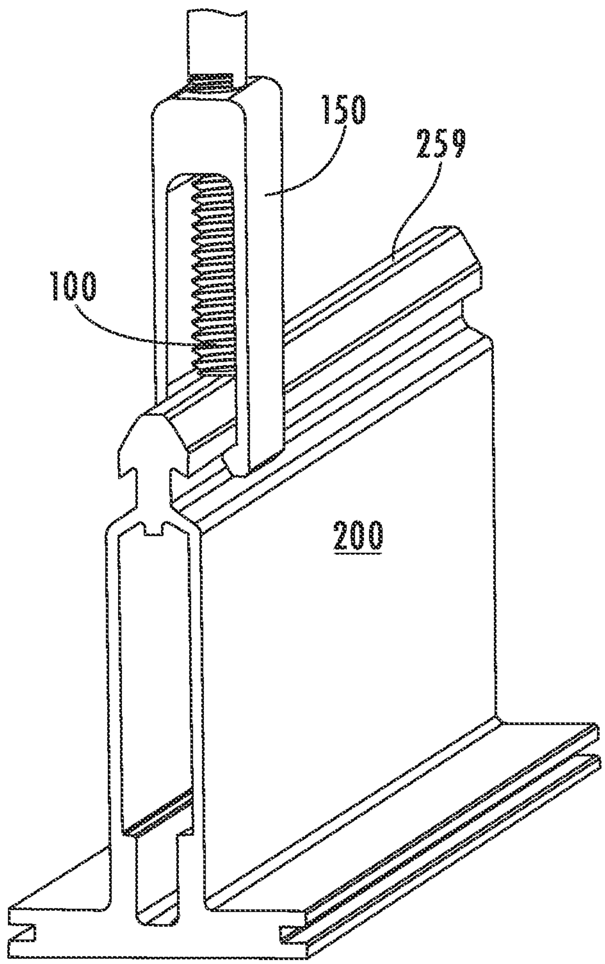
FIG. 15 is an isometric view of the suspension system of the present invention showing the method to prevent the hanger movement alongside the top of the tee.

When the head portion 255 of the rail 250 is positioned within the interior slot of the hanger 150, the notches 158 come in contact with lips 256 under the tee head 255. This engagement prevents any vertical movement of the tee 200 in relation with the hanger 150. Under this condition, the vertical force of the tee's 200 own weight and loads attached to the tee 200 are solidly transmitted to the hanger 150 by the interface of the hanger notches 158 and the rail lips 256. The long legs 152 on the hanger 150 allow sufficient elastic deflection of the legs 152, to spread the hook's 155 ridges 156 over the tee head's 255 ridges 257. Once the hanger hooks 155 pass the ridges 257, the elastic movement of the legs 150 returns the hooks 155 to a position where the notches 158 and lips 256 are in contact. This configuration allows the nesting of the hanger 150 around the rail structures 250 at the top of the tee 200. Once the hanging element 150 is engaged to the rail structures 250, to prevent movement of the hanging element 150 alongside the rail 250, the threaded rod 100 is fully threaded into the hanger element body 151, until the bottom part of the threaded rod 100 is in contact with the top surface 259 of the tee head 255 as shown by FIG. 15.

Figure 16:
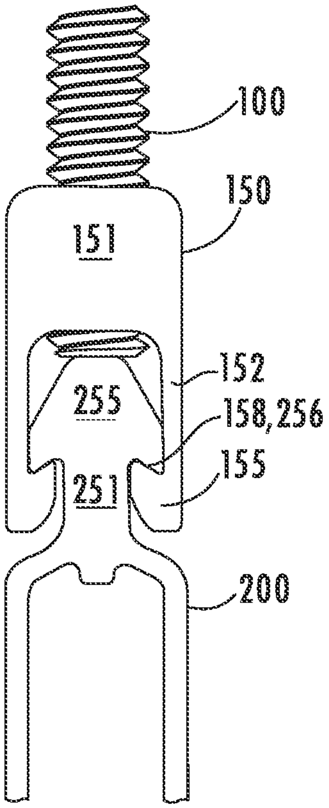
FIG. 16 depicts the alternate embodiment of the present invention where the hanger is slid into the tee upper elements for engagement.

In an alternate embodiment of the suspended ceiling grid hanging system shown by FIG. 16, the hanging element 150 has shorter legs 152 and the same hooks 155 to engage in contact with the rail head's 255 lips 256. This configuration of the hanger element 150 only allows engagement into the tee structure by sliding the hanger element 150 from the ends of the tee 200 sections. This method of suspension works similar to the one described in the preferred embodiment but with the limitation of potential insertion from any section of the tee 200 after the tee 200 is assembled into the grid.

Figure 17:
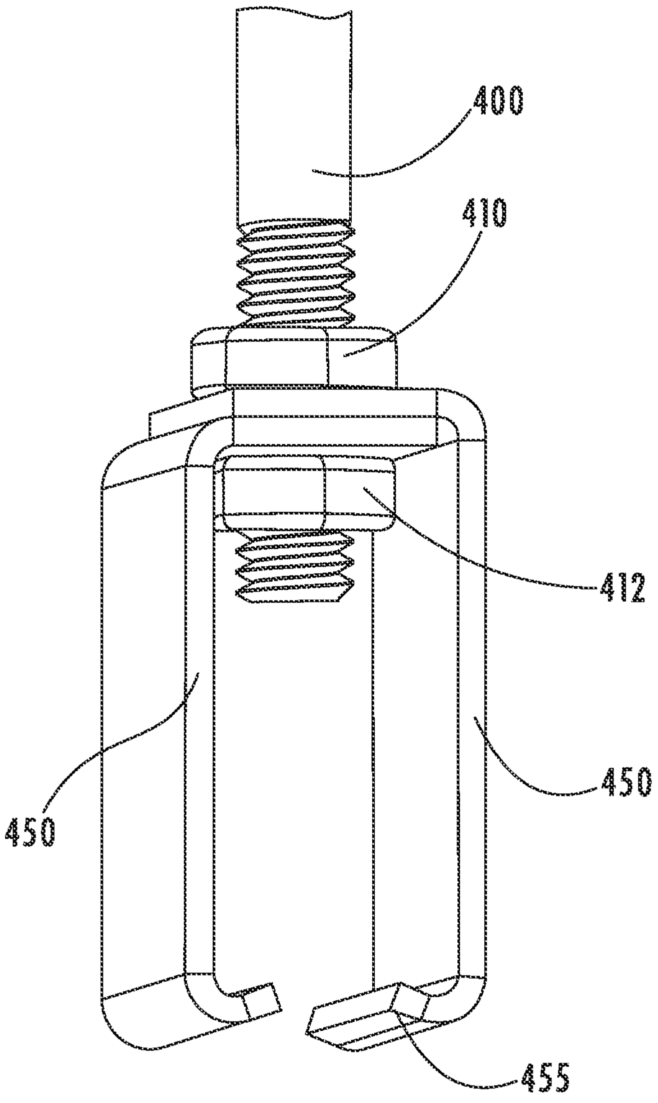
FIG. 17 is an isometric view depicting an alternate method of configuring the hanger for sliding or snapping onto the top of the tee structure.

Another alternate embodiment of the present invention is shown by FIG. 17, where the hanger 150 is configured by a couple of sheet metallic arms 450, joined together by a threaded rod 400 and nuts 410. The metallic arms comprise hooks 455 to engage onto the rail 250 of the tee 200 shown in FIG. 16. When engaged onto the rail 250 head 255 and neck 251, the hanger element 150 securely holds the weight of the tee 200. This alternate embodiment of the hanger may be configured to snap on top of the tee 200 by providing enough elastic movement to the hook arms 450, or could be slid at the end of the tee 200 as the hanger 150 shown by FIG. 16.

Figure 18:
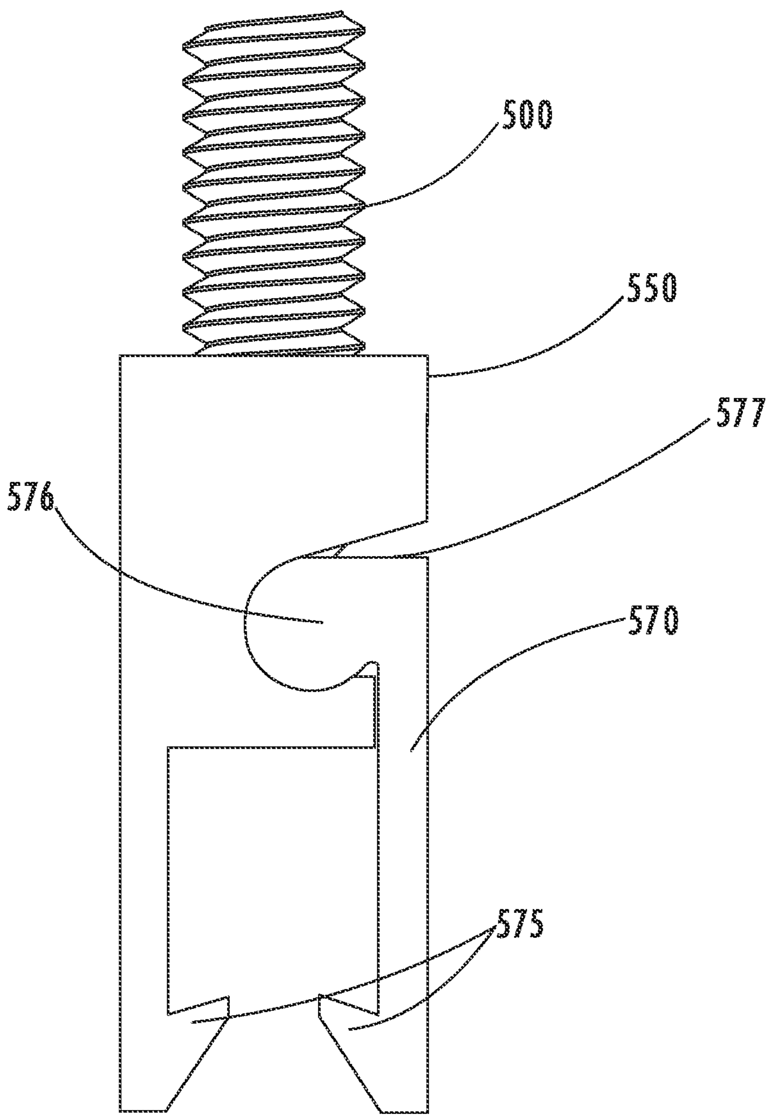
FIG. 18 is an illustration depicting another yet method of configuring the hanger for attachment onto the top of the tee structure.

Yet another alternate embodiment of the present invention is shown by FIG. 18, where the hanger 150 is configured by two mating extruded elements, fixed element 550 and arm 570. The fixed element 550 is attached to the room structure by threaded rods 500. The arm 570 is allowed to rotate around the joint 576 to allow spreading of the hooks 575. As the hooks 575 are spread apart, the hanger 150 is able to go over the head 255 of the tee 200 (FIG. 16), then closed to engage the hooks 575 under the head 255 of the tee 200. By further engaging the threaded rod 500 into the hanger fixed element 550, the end of the threaded rod 500 contacts the upper surface 577 of the swivel arm 570, preventing the arm 570 from swinging out, thus assuring the proper engagement under the rail 250 head 255.

The cooperating structures described in the hanger 150 and the rail 250 of the tee 200 are sufficiently strong to assure that loads applied under the suspended ceiling grid will not dislodge or cause any permanent deformation of the elements on the grid suspension system. The shape of the remaining portions of the tees are completely independent from the suspension system object of the present invention and as the skill in the art may learn, there are many other possible configurations that will provide the attachment system and the loading capabilities as intended by the described elements which are just illustrative and not limiting to other shapes that provide similar functionality.

Figure 8:
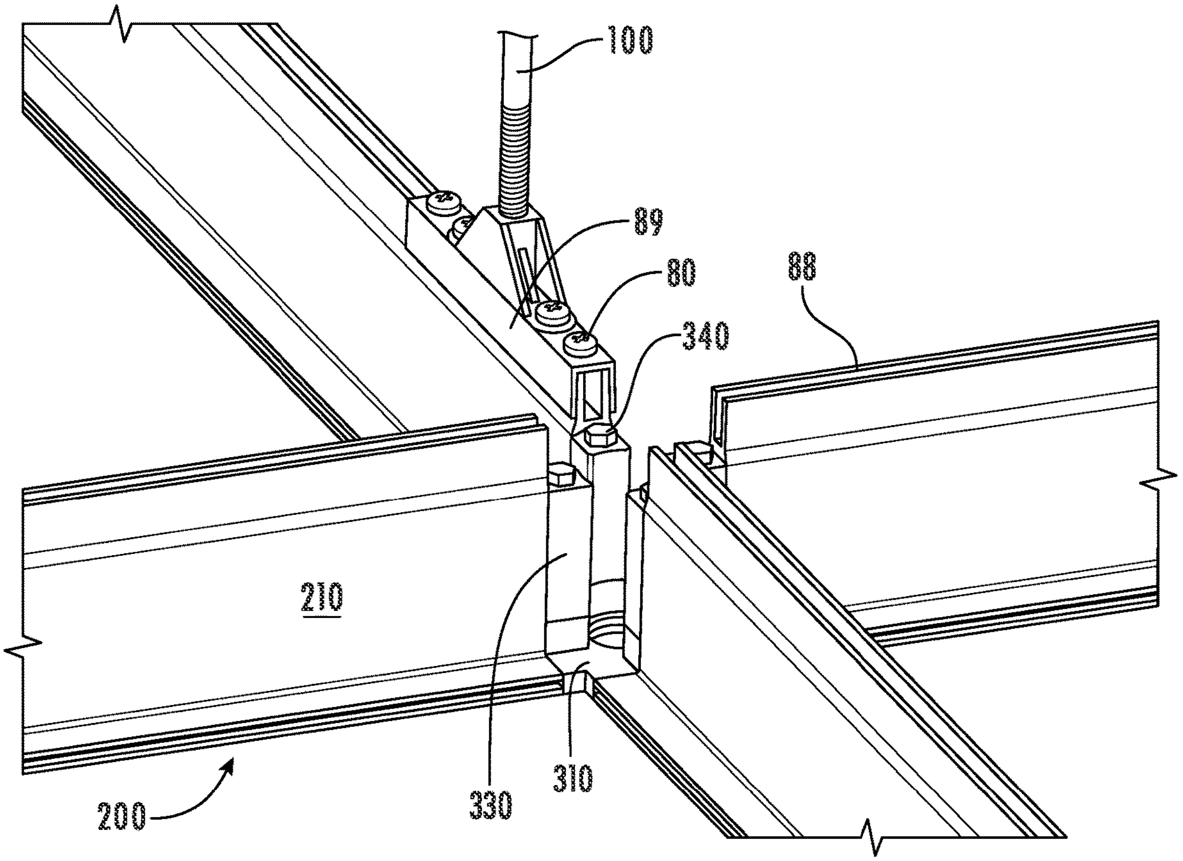
FIG. 8 shows an alternate embodiment of the modular suspended ceiling grid system of the present invention.
Figure 9:
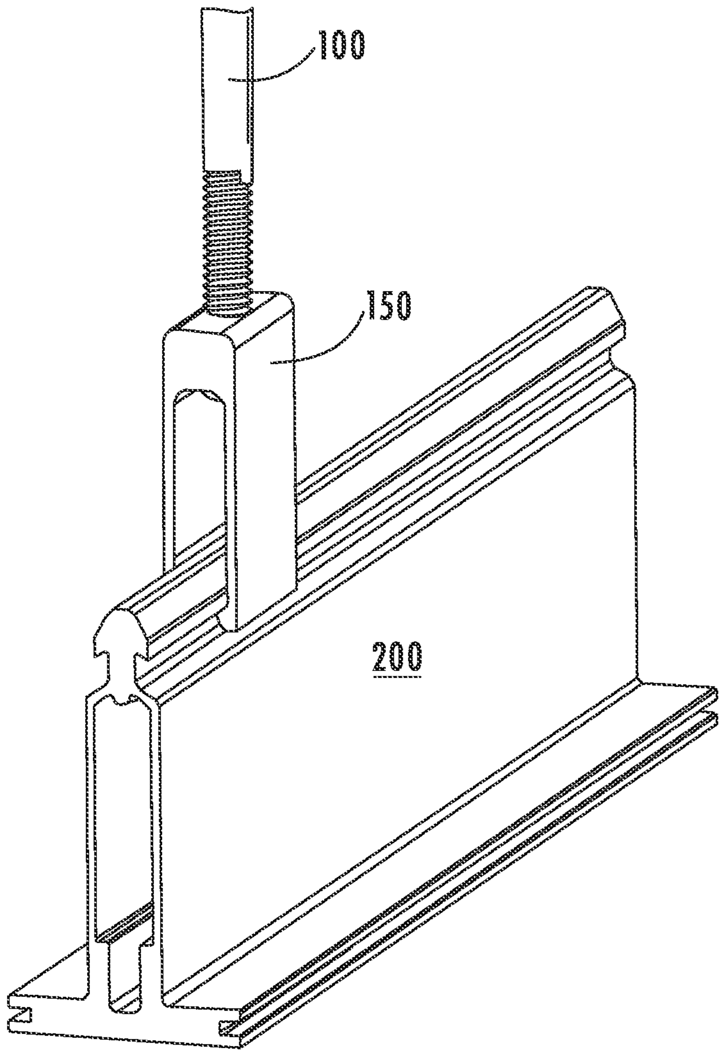
FIG. 9 is a representation of the suspended ceiling grid tee coupled with a hanging element object of the present invention.

A skilled artisan will readily recognize that the configuration shown by FIG. 3 is merely exemplary of the many tee suspension systems that may be used to suspend the modular grid system of the present invention from the structure of the building, without departing from the scope and spirit of the present invention. For example, the typical bolted elements shown in FIG. 1 could be used to suspend the modular grid system, rather than the hanger 150 shown in FIG. 3. This configuration is illustrated by FIG. 8 as an alternate embodiment of the present invention. In this configuration, the tee frame members 200 are made with a groove 88 at the top of the vertical portion of the tee frame member 200. This groove 88 contains continuous threads that are used to anchor a transitional element 89. The transitional element 89 is anchored to the tees 200 by bolts 80, threaded into the continuous threads at the top of the tee groove 88. The transitional element 89 is attached or suspended from the building structure by suspension rods 100. The bolted joining system offers a rigid and stable system to maintain the tees in an aligned and bonded position in a way similar to the traditional suspension system described by FIG. 1.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A modular suspended ceiling grid system comprising:

a. a plurality of tee frame members, wherein each tee frame member comprises: (i) a horizontal base; and (ii) a hollow body extending vertically from the horizontal base, wherein the hollow body defines a tee cavity accessible from each end of the tee frame member;

b. a plurality of hubs, wherein each hub comprises: (i) a four-sided base; (ii) four raised pads extending vertically from the base, wherein each raised pad comprises a threaded bore; and (iii) a central hole positioned in the center of the hub and extending through hub, wherein the central hole has an upper opening positioned on the top side of the hub, and wherein the central hole has a lower opening positioned on the bottom side of the hub; and c. a plurality of tee couplers, wherein each tee coupler comprises: (i) a tail section adapted to be disposed at least partially within the tee cavity of one of the plurality of tee frame members; and (ii) a head section adapted to be attached to one of the four raised pads of one of the plurality of hubs.

2. The modular suspended ceiling grid system of claim 1, wherein a sprinkler tube enters the central hole through the upper opening and exits through the lower opening.

3. The modular suspended ceiling grid system of claim 1, wherein the central hole is capped with a plug when not in use.

4. The modular suspended ceiling grid system of claim 1, wherein the head section of the tee coupler comprises a hole to receive a fastener.

5. The modular suspended ceiling grid system of claim 4, wherein the hole in the coupling head is positioned to align with one of the threaded holes in the raised pads of the hub.

6. The modular suspended ceiling grid system of claim 5, wherein a fastener runs through the hole in the coupling head and threadingly engages one of the threaded bores in the joining hub.

7. The modular suspended ceiling grid system of claim 1, wherein a bottom surface of the horizontal base of the tee frame member is flush with a bottom surface of the hub when the tee frame member is coupled to the hub.

8. The modular suspended ceiling grid system of claim 1, further comprising a plurality of hangers to suspend the grid system from a building structure.

9. The modular suspended ceiling grid system of claim 8, wherein each tee frame member further comprises a rail positioned on the top of the hollow body, wherein the rail comprises a neck portion and a head portion having a lip.

10. The modular suspended ceiling grid system of claim 9, wherein each hanger comprises: (i) a body section; and (ii) two leg members extending from the body to define an interior slot, each leg member comprising a terminal hook.

11. The modular suspended ceiling grid system of claim 10, wherein, when the head portion of one of the plurality of tee frame members is positioned within the interior slot of one of the plurality of hangers, the lip of the head portion of the rail engages the terminal hooks of the hanger to secure the tee frame member to the hanger.

12. The modular suspended ceiling grid system of claim 8, wherein the tee frame member further comprises a groove with continuous threads, and wherein each hanger comprises a casting that is connected to the tee frame member by fasteners that threadingly engage the continuous threads of the groove.

13. A modular suspended ceiling grid system comprising:

a. a plurality of hangers, wherein each hanger comprises: (i) a body section; (ii) two leg members extending from the body to define an interior slot, each leg member comprising a terminal hook; and (iii) a suspension rod that connects the hangers to a building structure and threadingly engages with the body section of the hangers; and b. a plurality of tee frame members, wherein each tee frame member comprises: (i) a horizontal base; (ii) a body extending vertically from the horizontal base; and (iii) a rail positioned on the top of the body, wherein the rail comprises a neck portion and a head portion having a lip; wherein, when the head portion of one of the plurality of tee frame members is positioned within the interior slot of one of the plurality of hangers, the lip of the head portion of the rail engages the terminal hooks of the hanger to secure the tee frame member to the hanger; and c. wherein, when the head portion of one of the plurality of tee frame members is positioned within the interior slot of one of the plurality of hangers, a bottom surface of the threaded suspension rod comes into contact with a top surface of the head portion of the tee frame member.

14. The modular suspended ceiling grid system of claim 13, further comprising a plurality of hubs, wherein each hub comprises: (i) a four-sided base; and (ii) four raised pads extending vertically from the base, wherein each raised pad comprises a threaded bore.

15. The modular suspended ceiling grid system of claim 14, wherein the bodies of each of the plurality of tee frame members are hollow and define a tee cavity accessible from each end of the tee frame member.

16. The modular suspended ceiling grid system of claim 15, further comprising a plurality of tee couplers, wherein each tee coupler comprises: (i) a tail section adapted to be disposed at least partially within the tee cavity of one of the plurality of tee frame members; and (ii) a head section adapted to be attached to one of the four raised pads of one of the plurality of hubs, wherein the head section comprises a hole for receiving a fastener.

17. The modular suspended ceiling grid system of claim 16, wherein a fastener passes through the hole of the head of the tee coupler and threadingly engages with the threaded bore of the hub.

* * * * *